W. F. STEWART.
VEHICLE TIRE.
APPLICATION FILED JULY 3, 1915.
1,173,891.    Patented Feb. 29, 1916.
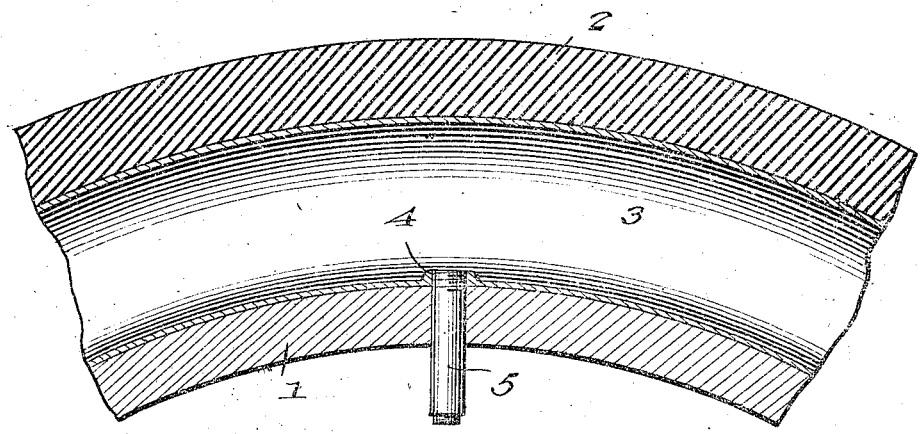
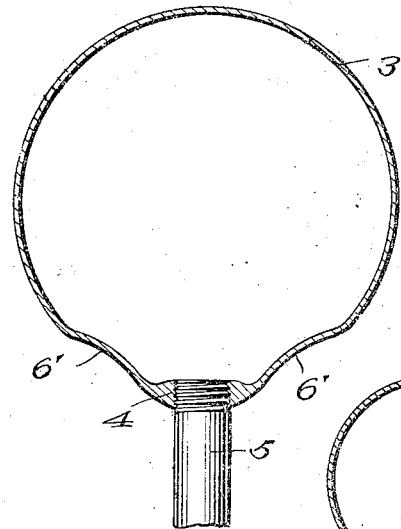
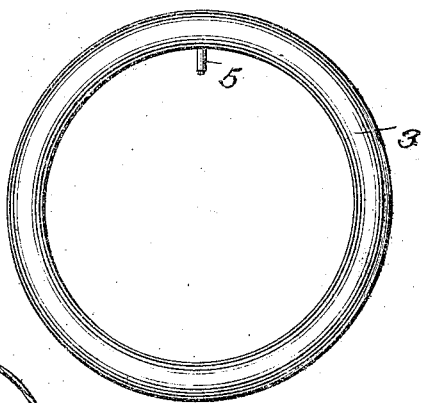
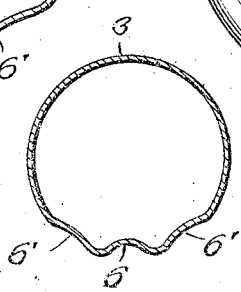
Inventor
William F. Stewart
By Victor J. Evans
Attorney
Witnesses
Hugh H. Ott
John J. McCarthy

UNITED STATES PATENT OFFICE.

WILLIAM F. STEWART, OF PEKIN, ILLINOIS.

VEHICLE-TIRE.

1,173,891.

Specification of Letters Patent.　　Patented Feb. 29, 1916.

Application filed July 3, 1915.　Serial No. 37,919.

*To all whom it may concern:*

Be it known that I, WILLIAM F. STEWART, a citizen of the United States, residing at Pekin, in the county of Tazewell and State of Illinois, have invented new and useful Improvements in Vehicle-Tires, of which the following is a specification.

This invention relates to certain novel and useful improvements in vehicle tires and has particular application to an inner tube for tires of the inner tube type.

In carrying out the present invention, it is my purpose to provide an inner tube which will be formed of spring steel or analogous material and which may be quickly and conveniently placed in the outer casing or shoe of the tire, thereby preventing blow-outs and punctures and enabling the maximum wear to be obtained from the casing.

With the above and other objects in view, the invention consists in the construction, combination and arrangement of parts hereinafter set forth in and falling within the scope of the claim.

In the accompanying drawing: Figure 1 is a fragmentary longitudinal sectional view through a vehicle tire equipped with an inner tube constructed in accordance with the present invention. Fig. 2 is an enlarged cross sectional view through the inner tube. Fig. 3 is a view in side elevation of the same. Fig. 4 is a cross sectional view through the inner tube at a point remote from the valve.

Referring now to the drawing in detail, 1 designates the felly of a vehicle wheel, 2 the outer casing or shoe of the tire and 3 my improved inner tube disposed within the casing or shoe 2. In accordance with my present invention, this inner tube 3 is formed of spring steel and is provided with a valve opening 4 within which is secured a valve 5 whereby air may be forced into the tube and held therein. The ends of the metal inner tube are welded together preferably electrically. As previously stated, this inner tube is formed of spring steel or analogous tough material and when filled with air acts as an air cushion so that the transmission of shocks and jars to the body of the vehicle will be minimized. It will be noted that this metal inner tube has an inherent quality which will prevent blow-outs and punctures, while the rubber casing surrounding such tube may be worn to shreds without affecting the tube, thereby enabling the maximum wear to be obtained from the casing. After the casing has been worn out such casing may be thrown away and the tube inserted in a new casing. This metal inner tube possesses all of the resilient qualities of the rubber inner tube and is proof against blow-outs and punctures as is apparent.

The inner circumference of the inner tube 3 is formed with a circular groove 6, as shown in Fig. 4, and this groove 6 starts at a point spaced apart from the valve 5 at one side of such valve and terminates at a point spaced apart from the valve at the opposite side of the valve. When the inner tube is inflated, that portion of the tube formed with the groove 6 tends to fill out, under the action of the air, and so increases the resiliency of the metal inner tube. At opposite sides of the groove 6, the wall of the tube 3 is formed with circular grooves 6', 6', as shown in Fig. 2, and those portions of the tube formed with the grooves 6' tend to fill out under air pressure to bind against the beads of the outer casing or shoe.

I claim:

An inner tube for vehicle tires formed of spring steel circular in cross section and having the meeting ends thereof secured together and formed with a valve opening and having the inner periphery thereof formed with a groove starting at a point at one side of the valve of the tube and terminating at a point at the opposite side of the valve of the tube and with grooves at the opposite sides of the first-mentioned groove, all of said grooves being adapted to fill out under the action of air in the tube to increase the resiliency of the tube and cause the latter to bind against the beads of the outer casing of the tire.

In testimony whereof I affix my signature in presence of two witnesses.

WILLIAM F. STEWART.

Witnesses:
H. M. EHRLICHER,
JAMES J. CROSBY.